(12) United States Patent
Minnick

(10) Patent No.: US 7,762,832 B2
(45) Date of Patent: Jul. 27, 2010

(54) SYSTEMS FOR PROVIDING ELECTRICAL INTERCONNECTION BETWEEN SOLAR MODULES

(76) Inventor: Jamie J. Minnick, 3305 Aldrich La., P.O. Box 201, Laurel, NY (US) 11948

( * ) Notice: Subject to any disclaimer, the term of this patent is extended or adjusted under 35 U.S.C. 154(b) by 292 days.

(21) Appl. No.: 11/848,710

(22) Filed: Aug. 31, 2007

(65) Prior Publication Data
US 2008/0194154 A1   Aug. 14, 2008

Related U.S. Application Data

(60) Provisional application No. 60/889,349, filed on Feb. 12, 2007.

(51) Int. Cl.
*H01R 13/64* (2006.01)
(52) U.S. Cl. ................. 439/374; 136/244
(58) Field of Classification Search ............ 439/535, 439/842, 625, 425, 374, 523, 358, 372; 174/50, 174/58; 136/244, 251, 246, 256
See application file for complete search history.

(56) References Cited

U.S. PATENT DOCUMENTS

| | | | |
|---|---|---|---|
| 4,310,211 A | 1/1982 | Bunnell et al. | |
| 4,460,232 A | 7/1984 | Sotolongo | |
| 4,687,266 A | 8/1987 | Tanii et al. | |
| 5,951,785 A * | 9/1999 | Uchihashi et al. | 136/251 |
| 5,990,414 A | 11/1999 | Posnansky | |
| 6,051,782 A | 4/2000 | Wagner | |
| 6,093,884 A | 7/2000 | Toyomura et al. | |
| 6,105,317 A | 8/2000 | Tomiuchi et al. | |
| 6,201,180 B1 * | 3/2001 | Meyer et al. | 136/244 |
| 6,235,984 B1 * | 5/2001 | Wambach et al. | 136/256 |
| 6,245,987 B1 | 6/2001 | Shiomi et al. | |
| 6,344,612 B1 | 2/2002 | Kuwahara et al. | |
| 6,582,249 B1 | 6/2003 | Boeck et al. | |
| 6,655,987 B2 | 12/2003 | Higashikozono et al. | |
| 6,672,018 B2 * | 1/2004 | Shingleton | 52/173.3 |
| 7,029,329 B1 | 4/2006 | Huang | |
| 7,097,516 B2 | 8/2006 | Werner et al. | |
| 7,134,883 B2 | 11/2006 | Werner et al. | |
| 2007/0102036 A1 | 5/2007 | Cinnamon | |

* cited by examiner

*Primary Examiner*—Edwin A. Leon
(74) *Attorney, Agent, or Firm*—Carter, Deluca, Farrell & Schmidt, LLP; William J. Hoofe, IV

(57) ABSTRACT

An electrical interconnection system for connecting solar modules includes a plurality of solar module frames each having at least one plug port, the plug port including one or more plug holes, the plug port for receiving a plug connector including one or more electrical conductors corresponding to the one or more plug holes, the plug connector connecting solar modules.

10 Claims, 15 Drawing Sheets

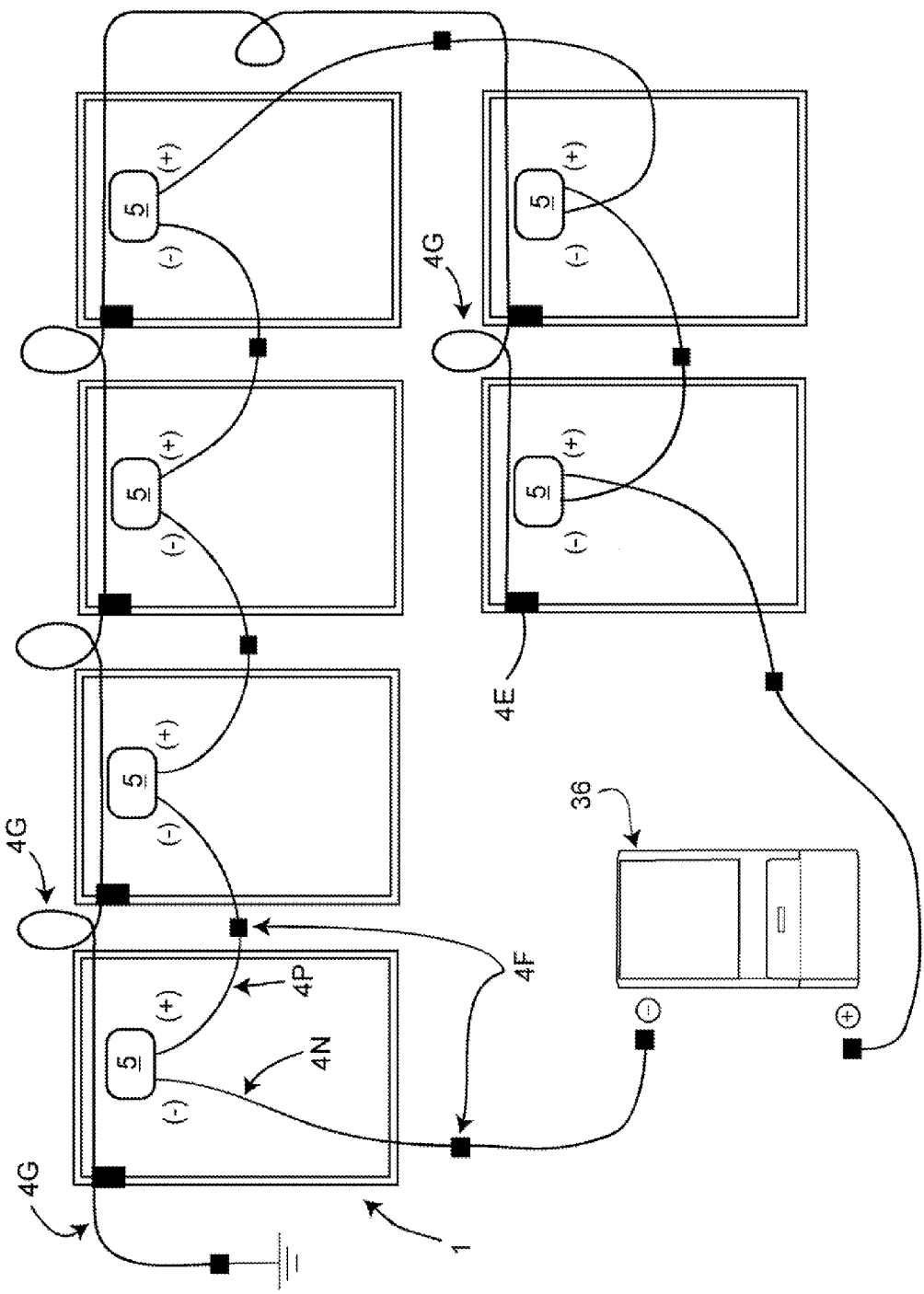

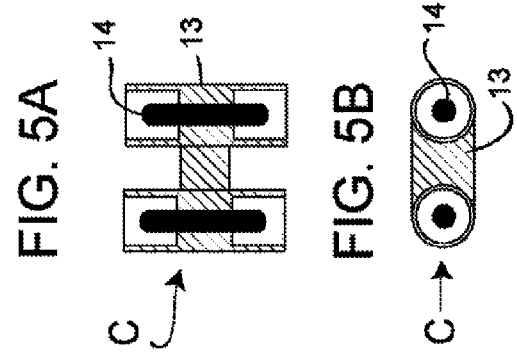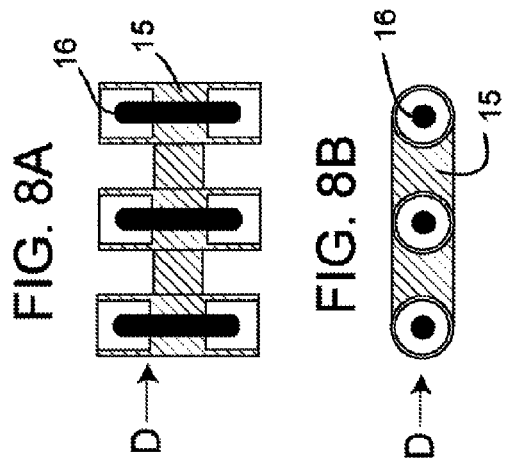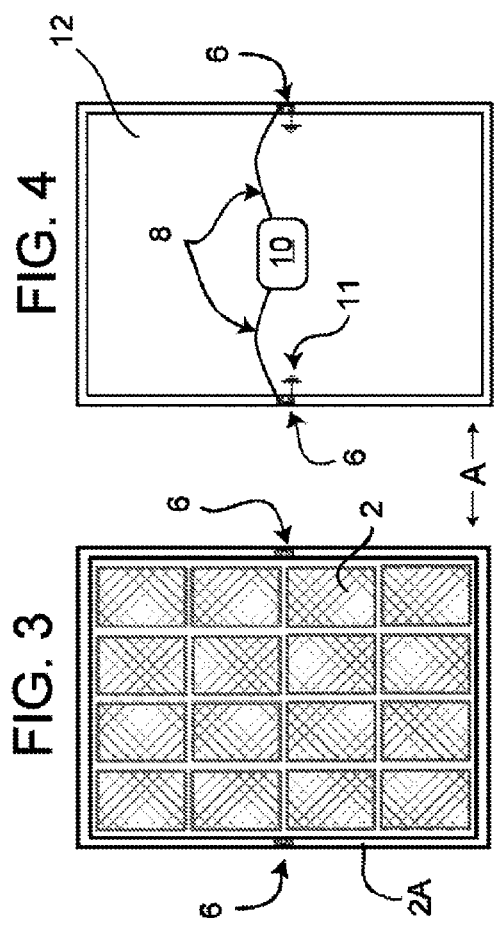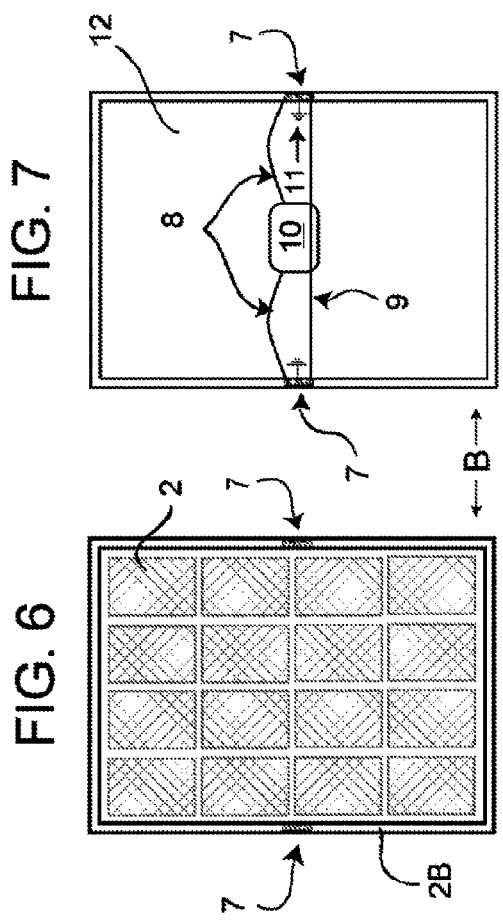

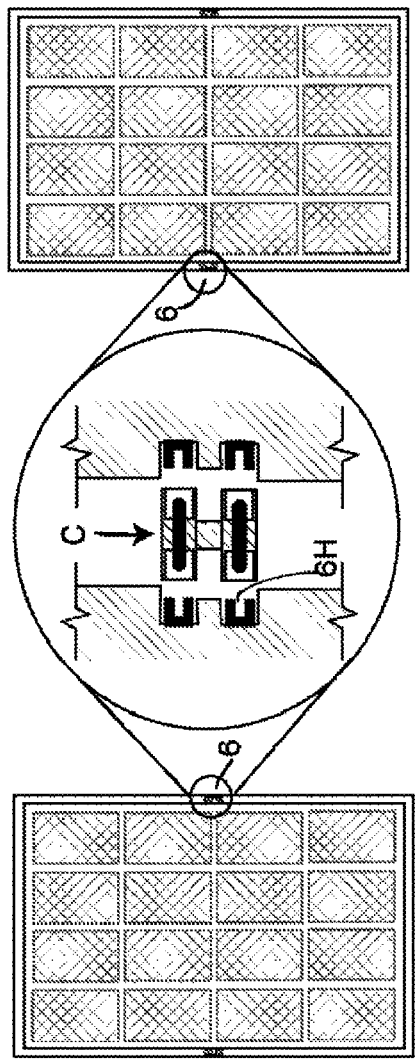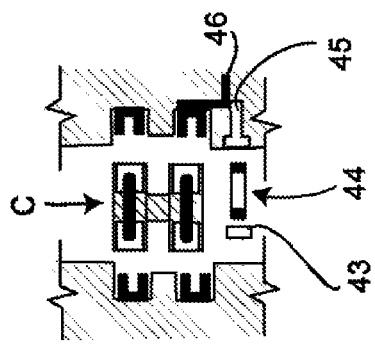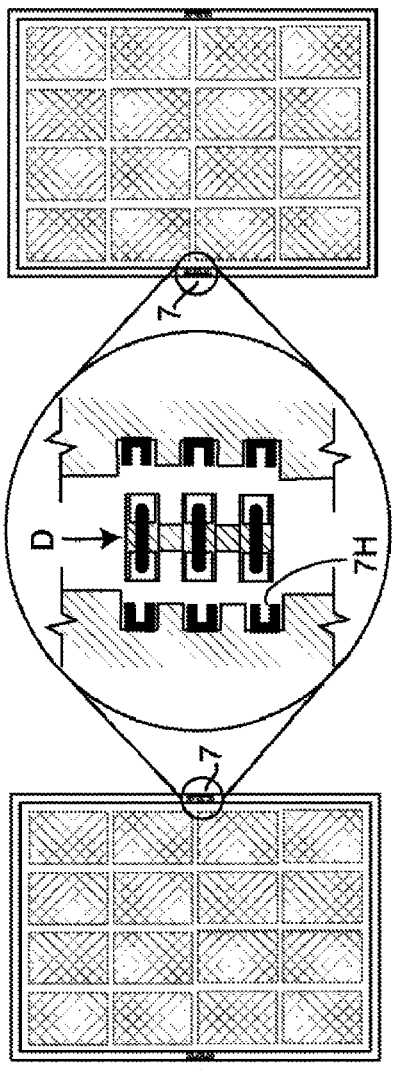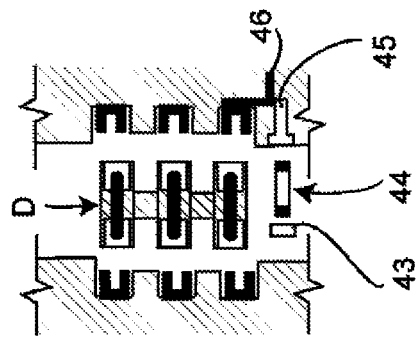

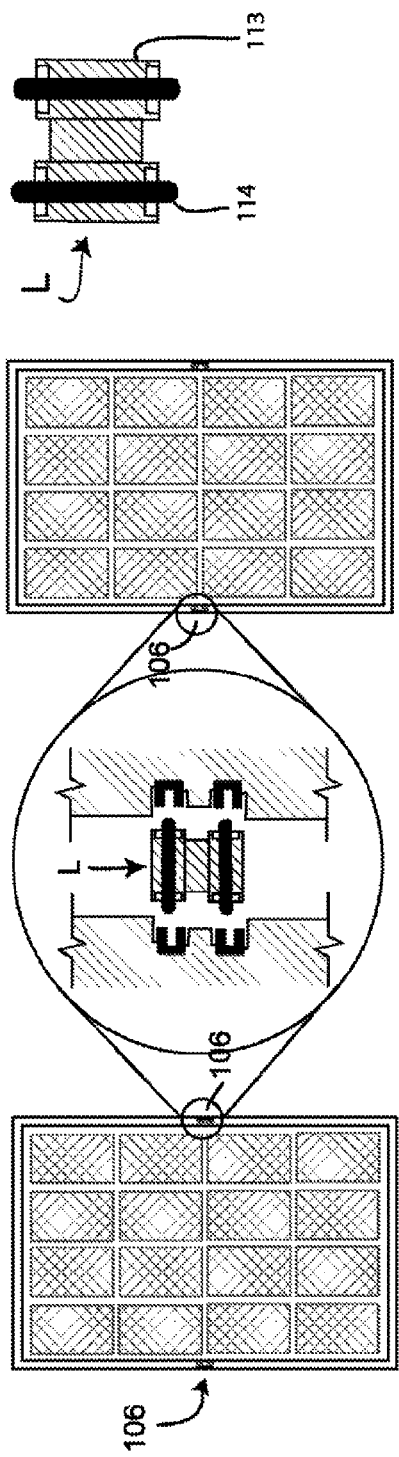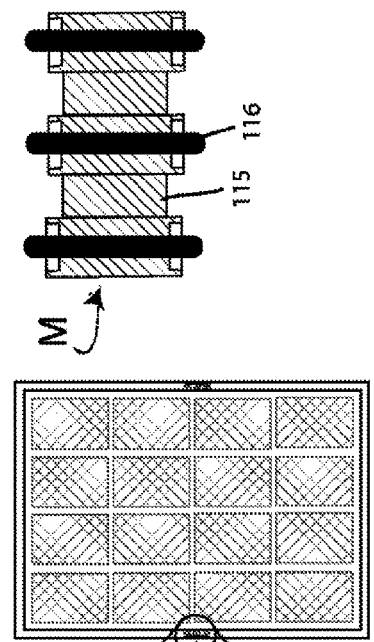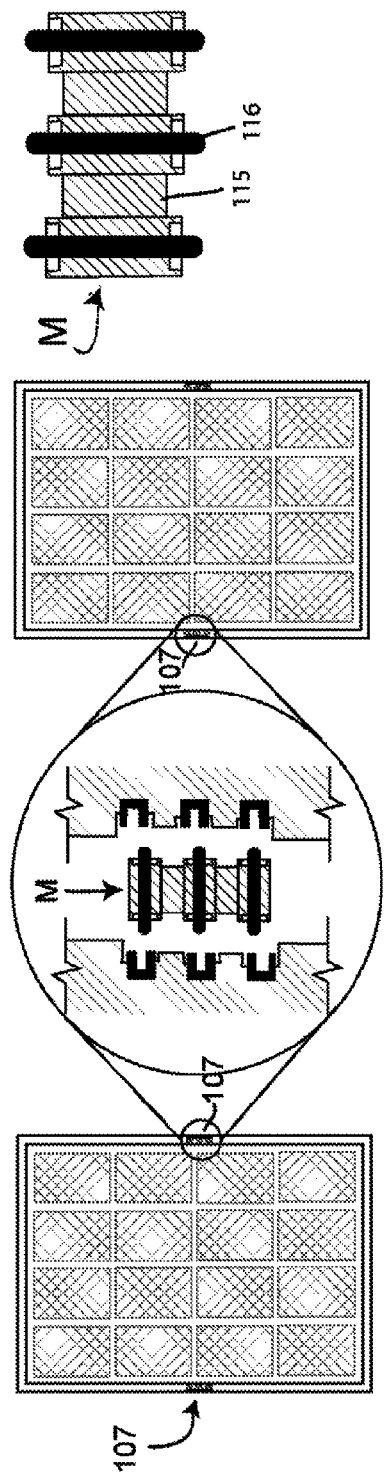

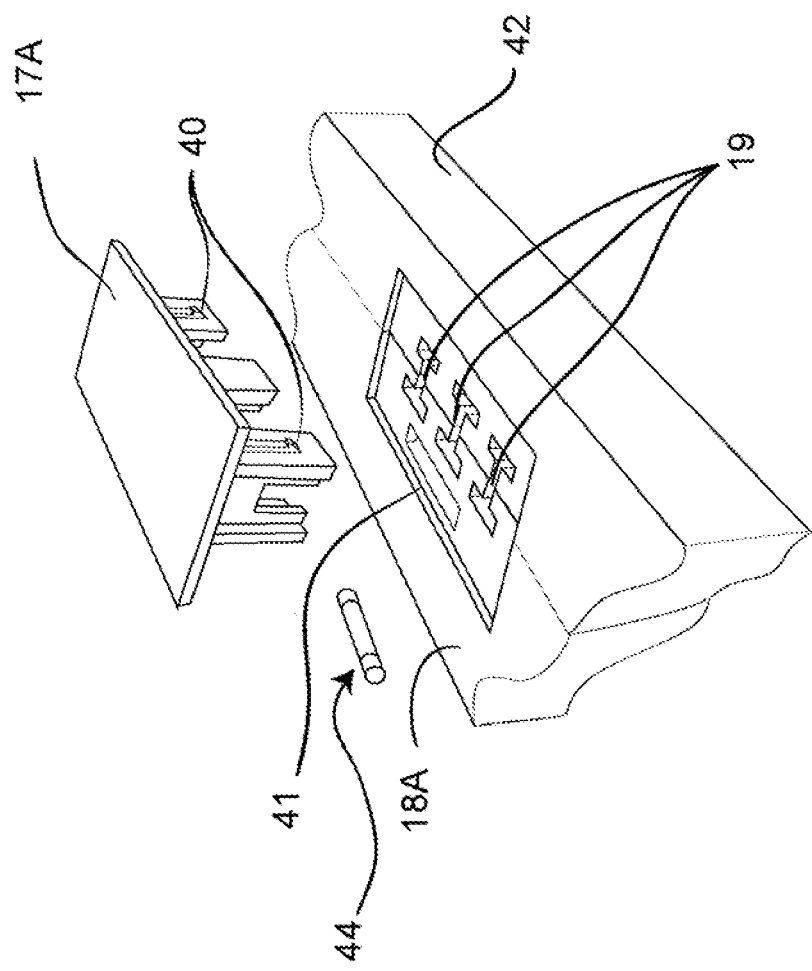
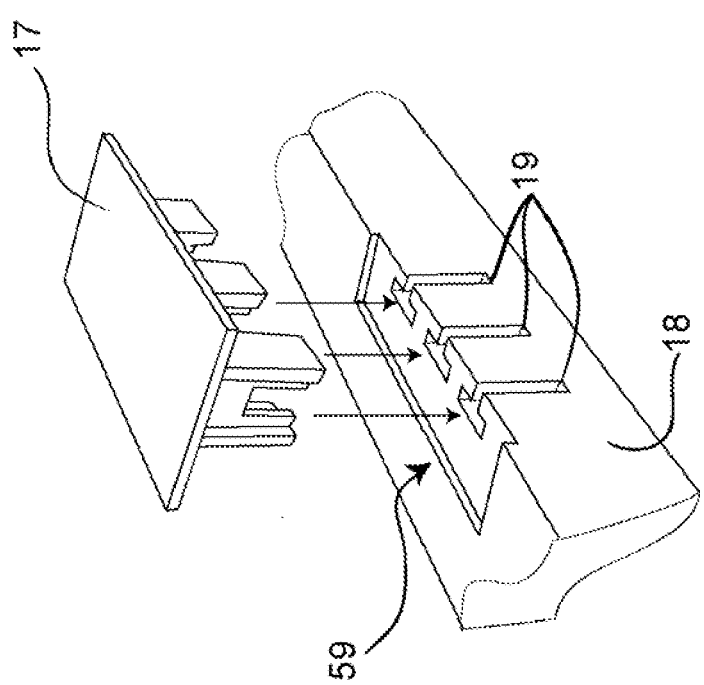
FIG. 13B
FIG. 13A

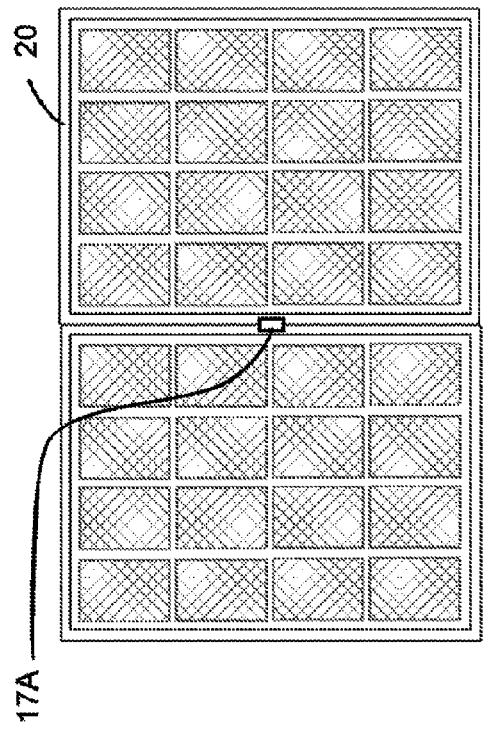
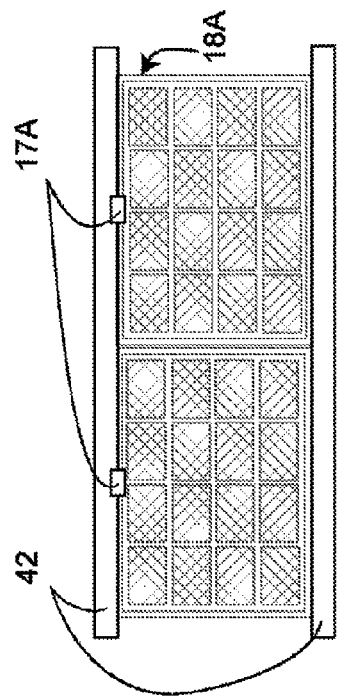
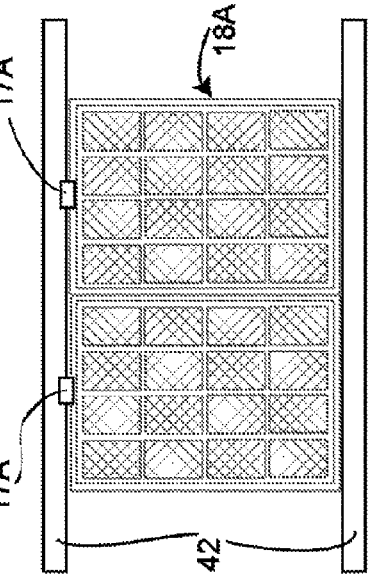

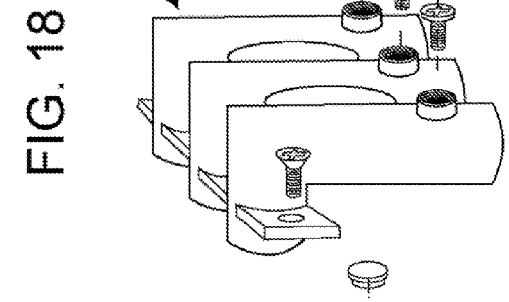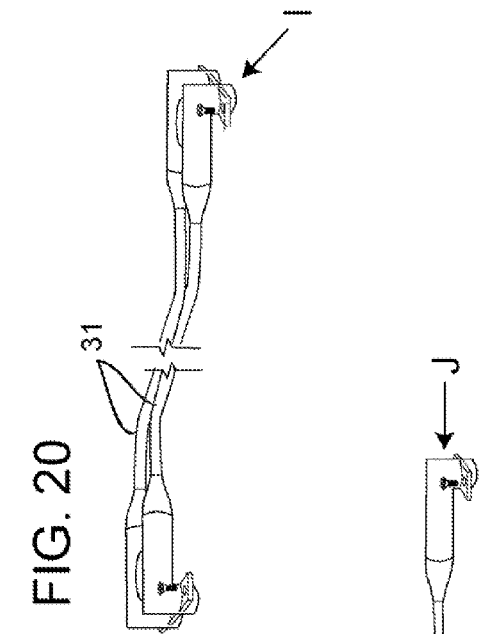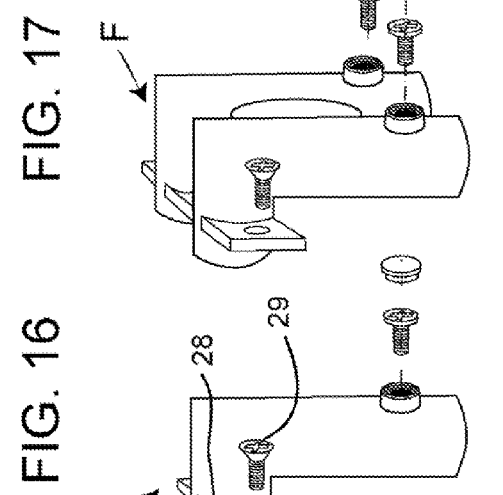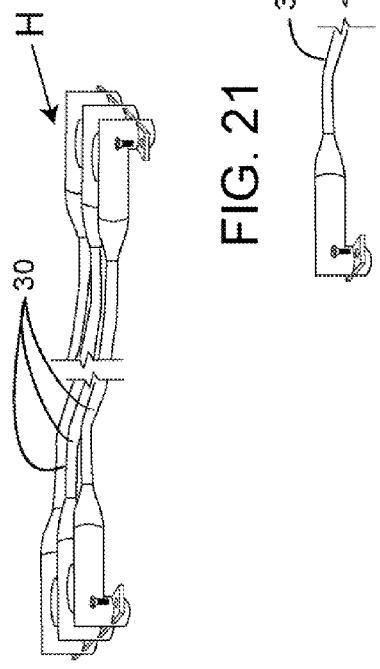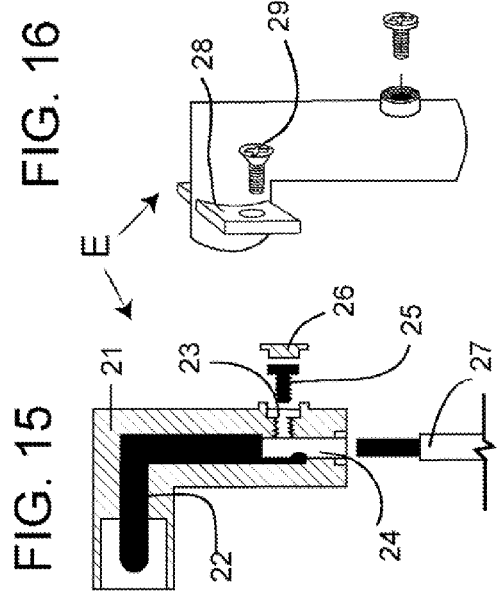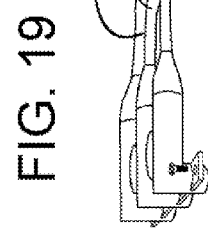

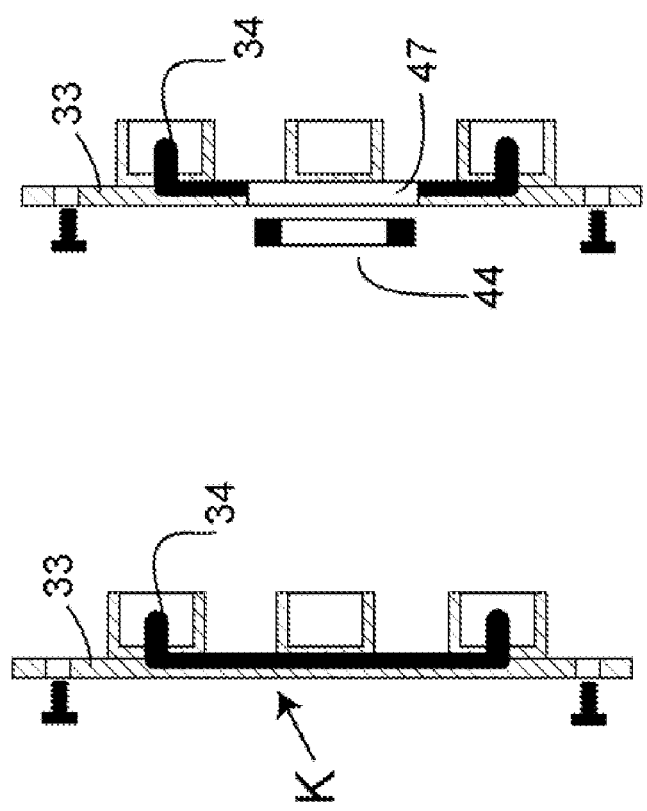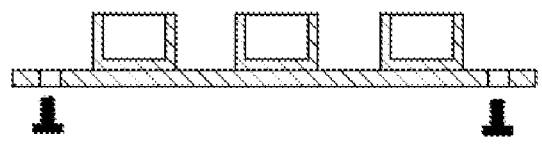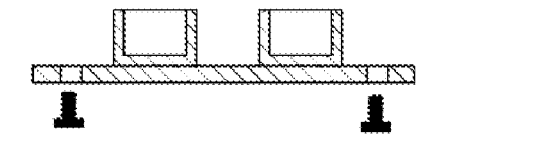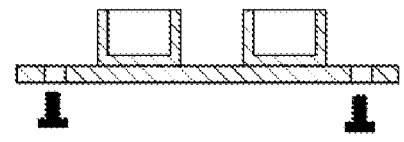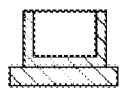

SYSTEMS FOR PROVIDING ELECTRICAL INTERCONNECTION BETWEEN SOLAR MODULES

CROSS-REFERENCE TO RELATED APPLICATION

This application claims the benefit of U.S. Provisional Application Ser. No. 60/889,349, filed Feb. 12, 2007 and entitled "Interconnection Plug Adaptors and Connection Plugs", the content of which is herein incorporated by reference in its entirety.

BACKGROUND OF THE INVENTION

1. Technical Field

The present disclosure relates to solar panel systems and, more particularly, to systems for providing electrical interconnection between solar modules.

2. Discussion of Related Art

In the solar industry, solar panel systems are constructed from solar modules. The solar modules are made up of many solar cells that are laminated together. FIGS. 1A and 1B are top and bottom plan views of a conventional solar module. Referring to FIGS. 1A and 1B, the conventional solar module 1 includes a plurality of solar cells 2, a negative lead wire 4N, a positive lead wire 4P, and a built-in junction box 5 formed in the base 3. The negative and positive lead wires 4N, 4P are used to make the electrical connections between the individual solar modules 1.

To provide a ground path, a continuous copper wire may be used for electrically connecting to every individual module. To reach every module, the system installer may run the copper wire across open areas or corridors that connect open areas, which can result in trip wires that can be difficult to detect and posing a potentially serious safety hazard.

FIG. 2 is a bottom plan view of an arrangement of conventional solar modules showing electrical interconnections between the modules. Referring to FIG. 2, the solar system includes a plurality of solar modules 1. During an installation procedure, the solar modules 1 are electrically interconnected using the negative lead wire 4N and the positive lead wire 4P of each of the solar modules 1 to make the electrical connections 4F to complete a string or array of modules. In addition, the installer may install a ground wire 4G for connection to a ground lug or ground screw 4E to complete an electrical ground for each individual module 1. As shown in FIG. 2, the positive and negative leads that extend from the solar panel system are connected to an electrical appliance 36, such as for example, a power inverter, charge control or battery.

To install modular systems, various types of mounting assembly can be employed to fasten/lock the modules onto a structure. For example, a mounting assembly, which may include a grid of mounting channels or tracks to support the modules, may provide mounting locations for the modules. Fasteners such as nails, adhesives, screws or other threaded fasteners may be used to connect the modules to the tracks.

In many solar panel systems, the individual solar modules 1 are fastened to a mounting assembly that is attached to a structure such as the roof of a building. In a typical installation, the system installer mounts the track assembly onto a rooftop, places the solar modules 1 into the track and then makes every individual electrical connection to electrically interconnect the solar modules 1. This is usually done with the aid of a helper to position the solar module 1 to enable the installer to reach the negative and positive lead wires 4N, 4P to make the connections. The installation procedure may include a fastening step to fasten the modules to the mounting assembly or support structure. The fastening step can be performed after all or some of the electrical connections are made.

Positioning the individual modules 1 to permit the system installer to fasten the lead wires 4N, 4P and 4E for making the electrical connections can be a difficult and time-consuming process. In addition, municipal regulations may require that a continuous ground wire be installed to each module. Using the traditional methods, the installation of a ground path may result in increased time and cost and may give rise to safety hazards. There is a need for systems for providing electrical interconnection between solar modules.

SUMMARY OF THE INVENTION

According to an exemplary embodiment of the present invention, an electrical interconnection system for connecting solar modules includes a plurality of solar module frames each having at least one plug port, the plug port including one or more plug holes, the plug port for receiving a plug connector including one or more electrical conductors corresponding to the one or more plug holes, the plug connector connecting solar modules.

According to an exemplary embodiment of the present invention, an electrical interconnection system for connecting solar modules includes a plurality of solar module frames each including at least one plug port disposed within an opening in each solar module frame, a support structure comprising a plurality of support elements each including at least one plug port disposed within an opening in each support element, wherein the solar module frames are supported by the support structure, and at least one plug connector adapted to commonly engage the plug port of one of the solar module frames and the plug port of one of the support elements to electrically connect the solar modules.

BRIEF DESCRIPTION OF THE DRAWINGS

The present invention will become readily apparent to those of ordinary skill in the art when descriptions of exemplary embodiments thereof are read with reference to the accompanying drawings.

FIG. 2 is a bottom plan view of an arrangement of conventional solar modules showing electrical interconnections between the modules.

FIGS. 3 and 4 are top and bottom plan views of a solar module including plug ports, according to an exemplary embodiment of the present invention.

FIG. 5A shows a cross-section in the longitudinal direction of a plug connector, according to an exemplary embodiment of the present invention.

FIG. 5B shows a cross-section perpendicular to the longitudinal direction of the plug connector of FIG. 5A, according to an exemplary embodiment of the present invention.

FIGS. 6 and 7 are top and bottom plan views of a solar module including plug ports, according to an exemplary embodiment of the present invention.

FIG. 8A shows a cross-section in the longitudinal direction of a plug connector, according to an exemplary embodiment of the present invention.

FIG. 8B shows a cross-section perpendicular to the longitudinal direction of the plug connector of FIG. 8A, according to an exemplary embodiment of the present invention.

FIG. 9A is an exploded view showing the plug connector of FIGS. 5A and 5B and two plug ports, according to an exemplary embodiment of the present invention.

FIG. 9B is an exploded view showing the plug connector of FIGS. 5A and 5B and a plug port that includes a fuse holder, according to an exemplary embodiment of the present invention.

FIG. 10A is an exploded view showing the plug connector of FIGS. 8A and 8B and two plug ports, according to an exemplary embodiment of the present invention.

FIG. 10B is an exploded view showing the plug connector of FIGS. 8A and 8B and a plug port that includes a fuse holder, according to an exemplary embodiment of the present invention.

FIG. 11A is an exploded view showing a plug connector and two plug ports, according to an exemplary embodiment of the present invention.

FIG. 11B shows a cross-section in the longitudinal direction of the plug connector of FIG. 11A, according to an exemplary embodiment of the present invention.

FIG. 12A is an exploded view showing a plug connector and two plug ports, which are respectively located within the frame of adjacent solar modules, according to an exemplary embodiment of the present invention.

FIG. 12B shows a cross-section in the longitudinal direction of the plug connector of FIG. 12A, according to an exemplary embodiment of the present invention.

FIG. 13A is a perspective view of a plug connector and a plug port, according to an exemplary embodiment of the present invention.

FIG. 13B is a perspective view of a plug connector and two plug ports, according to an exemplary embodiment of the present invention.

FIG. 13C is a plan view of adjacent solar modules and showing the plug connector of FIG. 13A, according to an exemplary embodiment of the present invention.

FIGS. 14A and 14B are plan views of adjacent solar modules coupled to support elements of a support structure and showing the plug connector of FIG. 13B, according to exemplary embodiments of the present invention.

FIG. 15 is a cross-sectional view of a plug connector, according to an exemplary embodiment of the present invention.

FIGS. 16, 17 and 18 are perspective views of plug connectors, according to exemplary embodiments of the present invention.

FIGS. 19, 20 and 21 are perspective views of plug connectors with pre-connected wiring, according to exemplary embodiments of the present invention.

FIGS. 22A and 22B are cross-sectional views of plug connector end terminals, according to exemplary embodiments of the present invention.

FIGS. 23, 24 and 25 are cross-sectional views of plug connector end terminals, according to exemplary embodiments of the present invention.

DESCRIPTION OF EXEMPLARY EMBODIMENTS

Figure 1B:
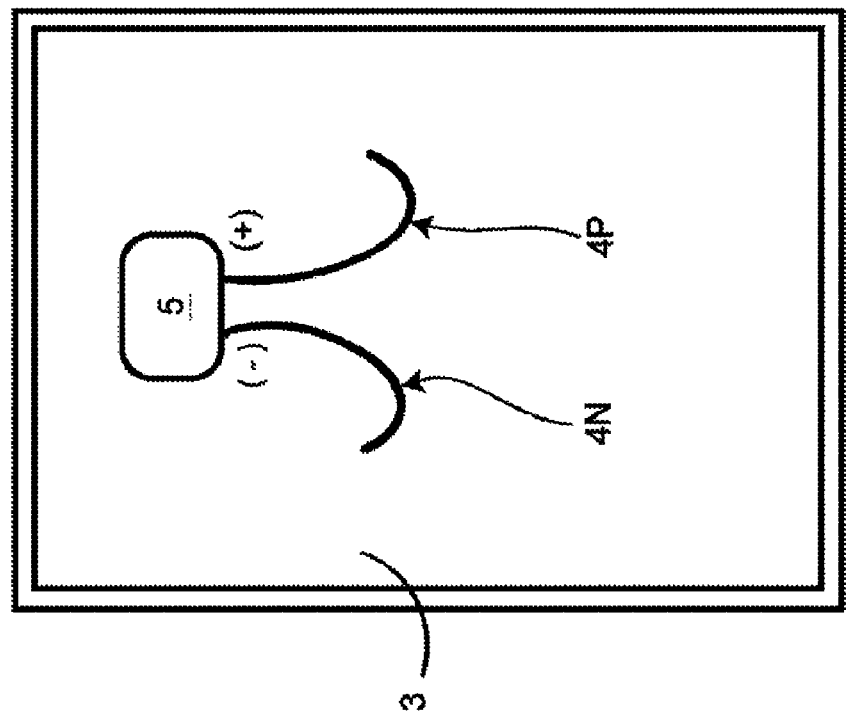
FIGS. 1A and 1B are top and bottom plan views of a conventional solar module.
Figure 1A:
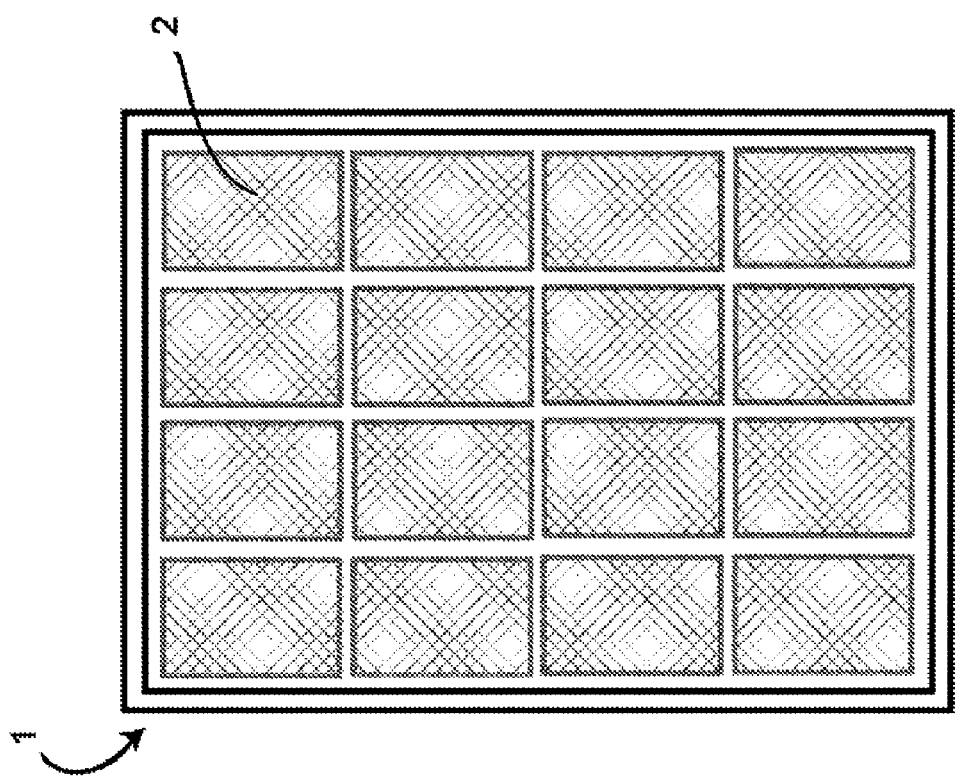

Hereinafter, exemplary embodiments of the present invention will be described in detail with reference to the accompanying drawings. Like reference numerals refer to similar or identical elements throughout the description of the figures. The term "module" as used herein refers to a solar module.

FIGS. 3 and 4 are top and bottom plan views of a solar module including plug ports, according to an exemplary embodiment of the present invention. Referring to FIG. 3, the solar module labeled "A" includes a frame 2A and a plurality of solar cells 2, which are arranged within the frame 2A. The frame 2A includes two plug ports 6, which are disposed at opposite lateral sides of the frame 2A. The plug ports 6 may be disposed at various locations, such as shown in FIGS. 36 through 41. It is to be understood that various number of the plug ports 6 may be included in the frame 2A.

The solar cells 2 may be arranged in a common plane to substantially fill an area within the frame 2A. The frame 2A may include one or more cross members (not shown). The solar cells 2 may be arranged laterally adjacent to one another. The solar cells 2 may be arranged on a substantially flat panel.

Referring to FIG. 4, the solar module A includes wiring 8, which may be built-in or exposed, a ground wire 11, which may be built-in or exposed, and a wiring box 10, which is coupled to the base 12 of the solar module A.

FIG. 5A shows a cross-section in the longitudinal direction of a plug connector labeled "C", according to an exemplary embodiment of the present invention. FIG. 5B shows a cross-section perpendicular to the longitudinal direction of the plug connector C of FIG. 5A, according to an exemplary embodiment of the present invention. Referring to FIGS. 5A and 5B, the plug connector C includes a housing 13 and two electrical conductors 14 arranged substantially in parallel, which are separated by nonconductive material.

The electrical conductors 14 are sized to be contained within the housing 13. The electrical conductors 14 comprise electrically conductive material. Examples of conductive material include metal, such as aluminum, copper, steel, titanium or tungsten, or conductive plastics. It is to be understood that electrical conductors 14 may be embodied using various conductive materials. The housing 13 may be electrically nonconductive or portions of the housing 13 may be electrically nonconductive. The housing 13 may be weather-proof or water-resistant.

FIGS. 6 and 7 are top and bottom plan views of a solar module including plug ports, according to an exemplary embodiment of the present invention. Referring to FIG. 6, the solar module labeled "B" includes a frame 2B and a plurality of solar cells 2, which are arranged within the frame 2B. The frame 2B includes two plug ports 7, which are disposed at opposite lateral sides of the frame 2B. It is to be understood that various number of the plug ports 7 may be included in the frame 2B.

Referring to FIG. 7, the solar module B includes wiring 8, which may be built-in or exposed, a ground wire 11, which may be built-in or exposed, and a wiring box 10, which is coupled to the base 12 of the solar module A. In an exemplary embodiment of the present invention, the ground wire 11 is built into the base of the module.

FIG. 8A shows a cross-section in the longitudinal direction of a plug connector labeled "D", according to an exemplary embodiment of the present invention. FIG. 8B shows a cross-section perpendicular to the longitudinal direction of the plug connector D of FIG. 8A, according to an exemplary embodiment of the present invention. Referring to FIGS. 8A and 8B, the plug connector D includes a housing 15 and three electrical conductors 16 arranged substantially in parallel, which are sized to be contained within the housing 15. The housing 15 may be weather-proof or water-resistant.

FIG. 9A is an exploded view showing the plug connector C of FIGS. 5A and 5B and two plug ports, according to an exemplary embodiment of the present invention. Referring to FIG. 9A, each plug port 6 includes two plug holes 6H. Each plug hole 6H, which includes a contact region comprising an electrically conductive material, is configured to receive an electrical conductor 14 of the plug connector C. For example, the plug holes 6H may be cylindrical in shape. The plug holes 6H may be T shaped. It is to be understood that the plug ports 6 may include plug holes of various shapes and sizes.

One or more plug ports 6 may be disposed within an opening in the frame 2A. For example, the plug port 6 may be configured to fit inwardly of an outer lateral surface of the frame 2A. The plug port 6 may be configured to be fastened to an exterior surface of the frame 2A. In an exemplary embodiment of the present invention, at least one plug hole of the plug port 6 is connected to ground. The plug port 6 may include an electrical current return path, for example, as designated by reference numeral 9 in FIG. 7.

As shown in FIG. 9A, the plug connector C is configured to fit the plug ports 6. It is to be understood that the shape and size of the electrical conductors of the plug connector C may be adapted to various possible shapes and sizes of the plug holes of the plug port 6. Circuit protection may be provided, for example, as shown in FIG. 9B. Plug connector C may be connected with plug ports 6 to complete electrical and ground connections.

FIG. 9B is an exploded view showing the plug connector C and a plug port that includes a fuse holder, according to an exemplary embodiment of the present invention. Referring to FIG. 9B, the fuse holder 45, which completes wire connections 46, may protect the wiring. It is to be understood that the fuse holder 45 may be disposed in various locations. The fuse 44 may be inserted into the fuse holder 45 and may be protected with a water-resistant cap 43. It is to be understood that various types of fuses or other circuit protection elements may be utilized.

FIG. 10A is an exploded view showing the plug D connector of FIGS. 8A and 8B and two plug ports, according to an exemplary embodiment of the present invention. Referring to FIG. 10A, each plug port 7 includes three plug holes 7H. Each plug hole 7H, which includes a contact region comprising an electrically conductive material, is configured to receive an electrical conductor 16 of the plug connector D. For example, the plug holes 7H may be cylindrical in shape. The plug holes 7H may be T shaped. It is to be understood that the plug ports 7 may include plug holes of various shapes and sizes.

One or more plug ports 7 may be disposed within an opening in the frame 2A. For example, the plug port 7 may be configured to fit inwardly of an outer lateral surface of the frame 2B. The plug port 7 may be configured to be fastened to an exterior surface of the frame 2B. In an exemplary embodiment of the present invention, at least one plug hole of plug port 7 is connected to ground.

As shown in FIG. 10A, the plug connector D is configured to fit plug ports 7. Circuit protection may be provided, for example, as shown in FIG. 10B. Plug connector D may be connected with plug ports 7 to complete electrical and ground connections.

FIG. 10B is an exploded view showing the plug connector D and a plug port that includes a fuse holder, according to an exemplary embodiment of the present invention. Referring to FIG. 10B, the fuse holder 45, which completes wire connections 46, may protect the wiring. It is to be understood that the fuse holder 45 may be disposed in various locations. The fuse 44 may be inserted into the fuse holder 45 and may be protected with a water-resistant cap 43.

FIG. 11A is an exploded view showing a plug connector labeled "L" and two plug ports, according to an exemplary embodiment of the present invention. Referring to FIG. 11A, each plug port 106 includes two plug holes. Each plug hole, which includes a contact region comprising an electrically conductive material, is configured to receive an electrical conductor 114 of the plug connector L. The plug ports 106 may be located within the frame of a solar module. The plug connector L may be connected with plug ports 106 to complete electrical and ground connections.

FIG. 11B shows a cross-section in the longitudinal direction of the plug connector L, according to an exemplary embodiment of the present invention. Referring to FIG. 11B, plug connector L may contain electrical conductors 114 partially disposed within the body 113. The body 113 may be electrically nonconductive or portions of the body 113 may be electrically nonconductive. The plug connector L may be used as an alternative to the plug connector C shown in FIGS. 9A and 9B.

FIG. 12A is an exploded view showing a plug connector labeled "M" and two plug ports, according to an exemplary embodiment of the present invention. Referring to FIG. 12A, each plug port 107 includes three plug holes. Each plug hole, which includes a contact region comprising an electrically conductive material, is configured to receive an electrical conductor 116 of the plug connector M. The plug ports 107 may be located within the frame of a solar module. The plug connector M may be connected with plug ports 107 to complete electrical and ground connections.

FIG. 12B shows a cross-section in the longitudinal direction of the plug connector M, according to an exemplary embodiment of the present invention. Referring to FIG. 12B, plug connector M may contain electrical conductors 116 partially disposed within the body 115. The body 115 may be electrically nonconductive or portions of the body 115 may be electrically nonconductive. The plug connector M may be used as an alternative to the plug connector D shown in FIGS. 10A and 10B.

FIG. 13A is a perspective view of a plug connector and a plug port according to an exemplary embodiment of the present invention. Referring to FIG. 13A, the plug connector 17 may be inserted into the module frame 18 having the plug port 59 to make electrical connections at contact regions 19, for example, to provide electrical interconnection between the two modules. The plug connector 17 may be use to provide a module-to-support-element electrical connection.

FIG. 13B is a perspective view of a plug connector and two plug, according to an exemplary embodiment of the present invention. Referring to FIG. 13B. the plug connector 17A, which includes a clip element 40, may be inserted into the module frame 18A to make electrical connections at plug port 19, for example, to provide electrical interconnection between two modules, as shown in FIG. 13C, or a module-to-support-element electrical connection, for example, as shown in FIG. 14A or 14B. Plug connector 17A may be used for fastening a module frame 18A to a support element 42 as shown in FIG. 13B. A clip-in plug connector (e.g., plug connector 17A with two clip elements 40) could be used to provide electrical interconnection between two modules or a module-to-support element electrical connection.

In FIG. 13B, the fuse 44 may provide wire protection when inserted into fuse holder 41. The fuse 44 may be accessible by removing the plug connector 17A from the plug port of the module frame 18A and the support element 42.

FIG. 13C is a plan view of adjacent solar modules and showing the plug connector of FIG. 13A, according to an exemplary embodiment of the present invention. Referring to FIG. 13C plug connector 17 may be inserted into the plug port of the module frame 20 to complete electrical connections FIGS. 14A and 14B are plan views of adjacent solar modules coupled to support elements of a support structure and showing the plug connector of FIG. 13B, according to exemplary embodiments of the present invention. Referring to FIGS. 14A and 14B, the module frame 18A may fit onto a support element 42, for example, where electrical connections could be made using a plug connector 17A with corresponding plug port. Plug connector 17A may function to fasten or lock the module into place. In such case, circuit protection may be installed with module frames 18A, such as for example, a fuse. Some or all wiring may be incorporated into a support structure, for example, by utilizing the support elements 42 as an electrical conduit to carry conductors.

FIG. 15 is a cross-sectional view of a plug connector, according to an exemplary embodiment of the present invention. Referring to FIG. 15, the plug connector labeled "E" contains an electrical conductor 22, which is configured to be inserted into a plug port of a solar module, and nonconductive material 21. The connection may be configured such that a wire 27 makes electrical contact to electrical conductor 22 using a fastener 25. The fastener 25 may be weather proof or water resistant. The fastener 25 may caped off by a nonconductive and isolative cap 26. The plug connector may house circuit protection within the housing, such as for example, a fuse.

FIGS. 16, 17 and 18 are perspective views of plug connectors, according to exemplary embodiments of the present invention. Referring to FIG. 16, the plug connector labeled "E" includes a flange 28. The plug connector E may be connected to a module via the flange 28 using a fastener 29. Referring to FIG. 17, the plug connector labeled "F" enables the connection of two electrical connections. Referring to FIG. 18, the plug connector labeled "G" enables the connection of up to three electrical connections.

FIGS. 19, 20 and 21 are perspective views of plug connectors with pre-connected wiring, according to exemplary embodiments of the present invention. Referring to FIG. 19, the plug connector labeled "H" includes three wire conductors 30. Referring to FIG. 20, the plug connector labeled "I" includes two wire conductors 31. Referring to FIG. 21, the plug connector labeled "J" includes one wire conductor 32.

Figure 28:
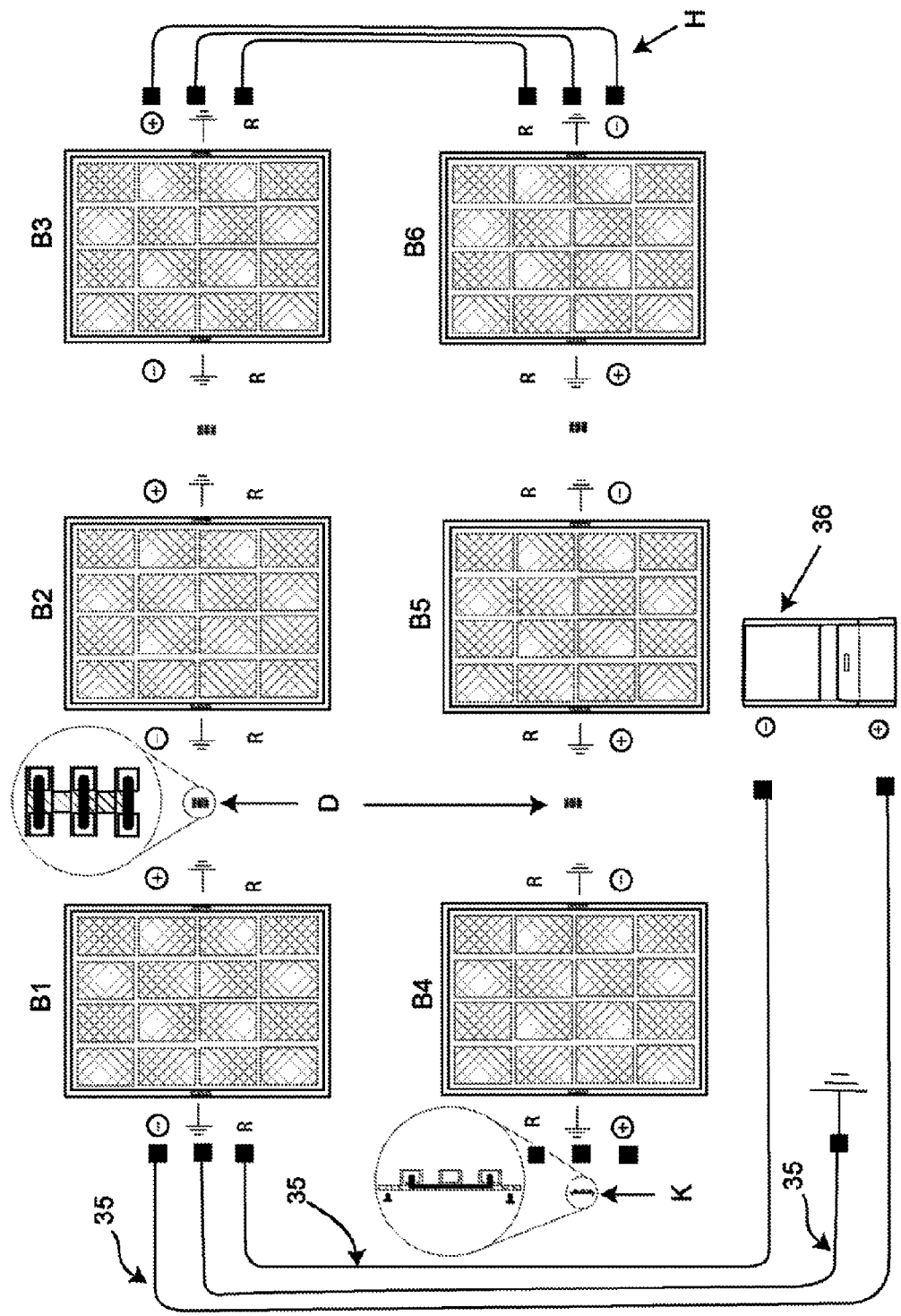
FIG. 28 is an exploded system view of solar modules and showing the plug connector of FIGS. 8A and 8B and the plug connector end terminal of 22A, according to an exemplary embodiment of the present invention.

FIGS. 22A and 22B are cross-sectional views of plug connector end terminals, according to exemplary embodiments of the present invention. Referring to FIGS. 22A and 22B, the plug connector end terminals K may include a jumper wire and/or a wire path for a return wire, with or without circuit protection, and may be used to seal an unused connection, for interconnecting modules or strings of module. A plug connector end terminal K may include a water-resistant housing and seal 33, containing a conductor 34, for example, electrically connecting a return wire as shown in FIG. 28. Circuit protection, such as for example, a fuse 44, may be inserted into a fuse holder 47, which may protect the wiring of the circuit.

FIGS. 23, 24 and 25 are cross-sectional views of plug connector end terminals, according to exemplary embodiments of the present invention. Although not shown as such in FIGS. 23, 24 and 25, the plug connector end terminals may incorporate a jumper wire and/or a wire path for a return wire, with or without circuit protection, and may be used to seal an unused connection, for interconnecting modules or strings of module.

Figure 26:
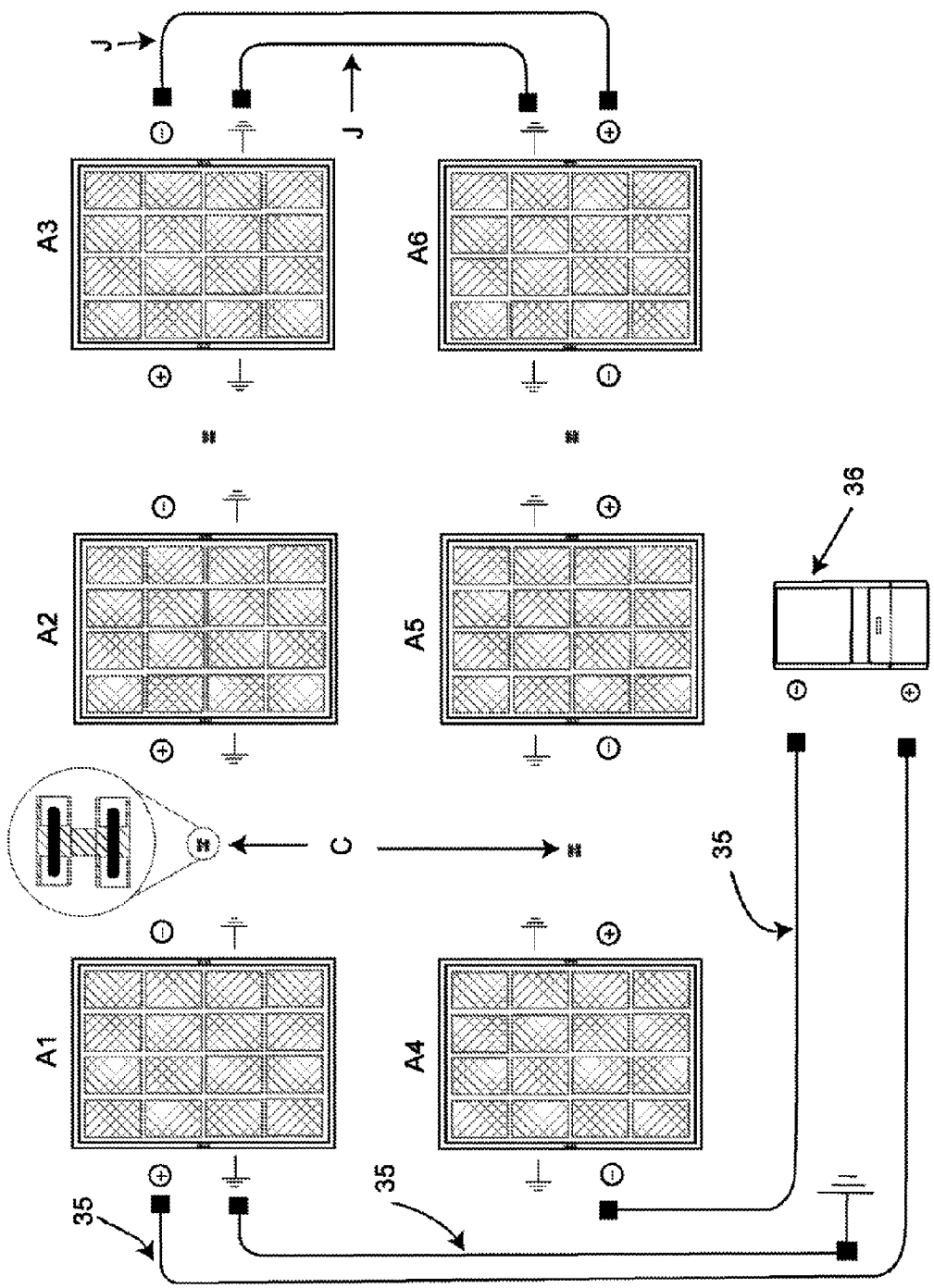
FIG. 26 is an exploded system view of solar modules and showing the plug connector of FIGS. 5A and 5B, according to an exemplary embodiment of the present invention.

FIG. 26 is an exploded system view of solar modules and showing the plug connector of FIGS. 5A and 5B, according to an exemplary embodiment of the present invention. The system may incorporate a jumper wire and/or a wire path for a return wire, with or without circuit protection, and may seal an unused connection for interconnecting modules or strings of modules, according to exemplary embodiments of the present invention.

Referring to FIG. 26, the "plus" sign (+) represents a positive electrical connection, the "negative" sign (−) represents a negative electrical connection and the ground symbol represents a ground electrical connection for each module. In FIG. 26, the system of modules A are electrically interconnected when brought together. The plug connector labeled "C" and the wiring with plug ends labeled "J" may connect the two rows together. Electrical wiring 35 may be run to an appliance 36, such as for example, a power inverter, charge controller, or battery.

Figure 27:
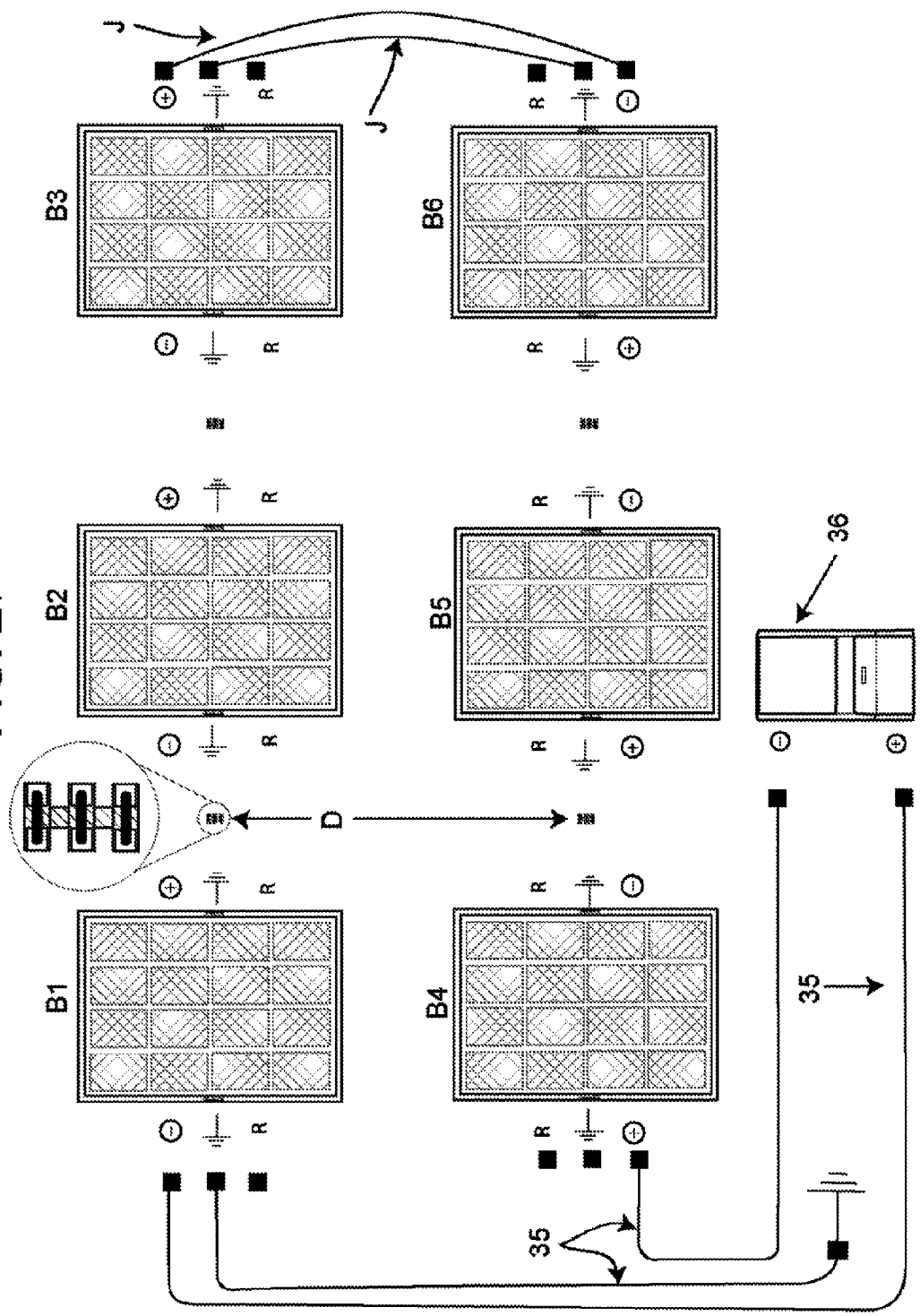
FIG. 27 is an exploded system view of solar modules and showing the plug connector of FIGS. 8A and 8B, according to an exemplary embodiment of the present invention.

FIG. 27 is an exploded system view of solar modules and showing the plug connector of FIGS. 8A and 8B, according to an exemplary embodiment of the present invention. The system may incorporate a jumper wire and/or a wire path for a return wire, with or without circuit protection, and may seal an unused connection for interconnecting modules or strings of modules, according to exemplary embodiments of the present invention.

Referring to FIG. 27, the plus sign (+) denotes a positive electrical connection, the negative sign (−) denotes a negative electrical connection, the ground symbol represents a ground electrical connection for each module, and the "R" represents a possible location for a return conductor according to exemplary embodiments of the present invention. The system of modules B are electrically interconnected when brought together, for example, the plug connector D completes the electrical connections between modules, while the plug connectors labeled "J", may connect the two rows together. For example, the solar modules B1 through B4 may be connected together and to an appliance. The solar modules B3 and B6 may be electrically connected through the use of two connectors J of FIG. 21. Electrical conductors 35 may be run to an appliance 36 to make electrical connections, such as for example, connecting a power inverter, charge controller, or battery.

FIG. 28 is an exploded system view of solar modules and showing the plug connector of FIGS. 8A and 8B and the plug connector end terminal of 22A, according to an exemplary embodiment of the present invention. The system may incorporate a jumper wire and/or a wire path for a return wire, with or without circuit protection, and may seal an unused connection for interconnecting modules or strings of modules, according to exemplary embodiments of the present invention.

Referring to FIG. 28 the plus sign (+) represents a positive electrical connection, the negative sign (−) represents a negative electrical connection the ground symbol represents a ground electrical connection, and letter "R" represents a built-in return path electrical conductor and possible location for each module according to exemplary embodiments of the present invention. In FIG. 28, the system of modules B, are electrically interconnected when brought together, for example, the plug end labeled "D", and the wiring with plug labeled "H" may connect the two rows together. Using the plug connector labeled "K" the positive electrical conductor may be connected with the return conductor "R" making it possible for the return wires 35 to be connected in one location before connecting to the appliance 36, such as for example, connecting a power inverter, charge controller, or battery. The current path may start from B1 at the (−) and follow along B2 and B3 where the plug connector H may jump down to a second row of modules and connect B6 to B5 and B4. At B4 the plug connector end terminal may connect the (+) to the "R" connection and send the electrical current back the original path to B1. All electrical connections for appliances may connect directly to B1.

Figure 29:
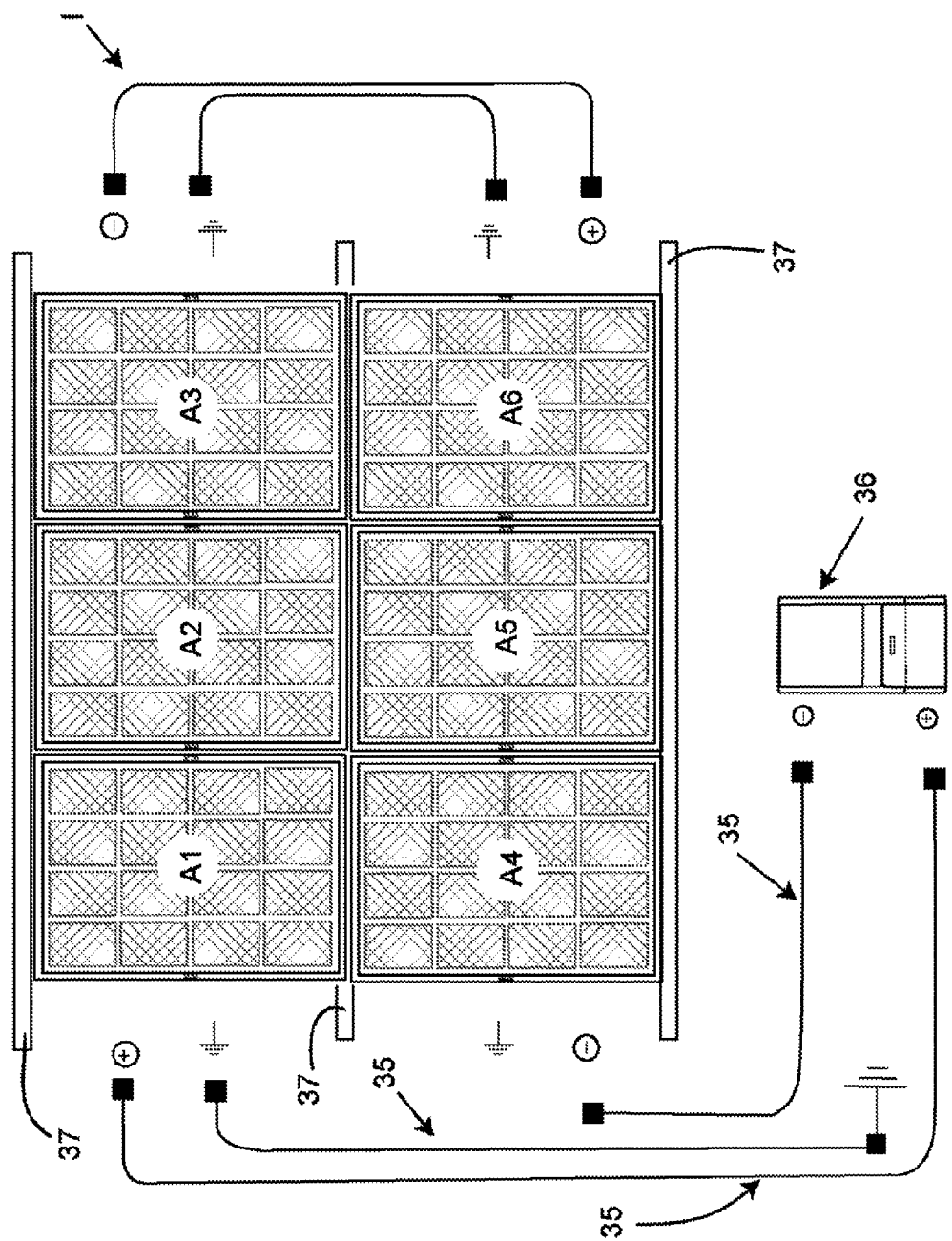
FIG. 29 is a system view of the solar modules of FIG. 28 coupled to a mounting system, according to an exemplary embodiment of the present invention.
Figure 31:
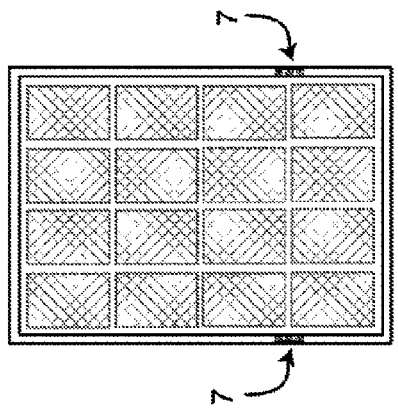
FIGS. 30 through 35 are plan views of solar modules, according to exemplary embodiments of the present invention.
Figure 32:
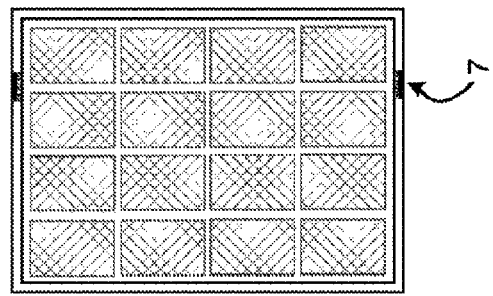
Figure 34:
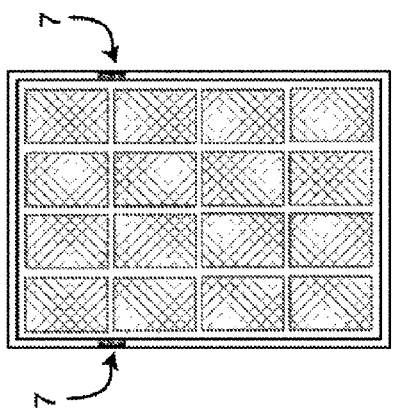
Figure 35:
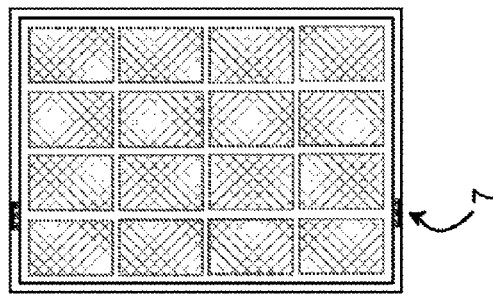
Figure 30:
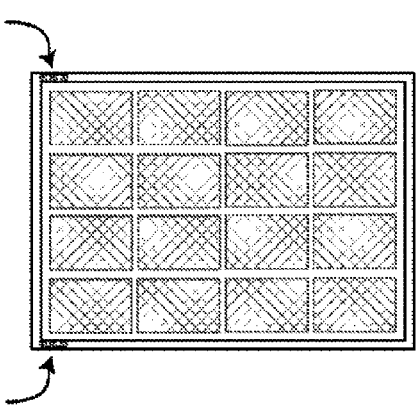
Figure 33:
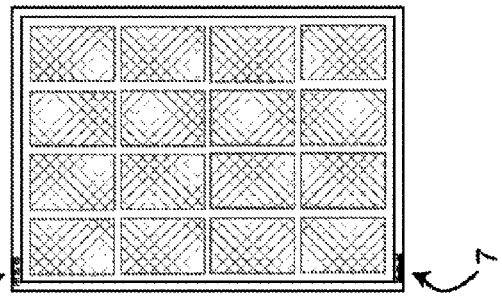
Figure 36:
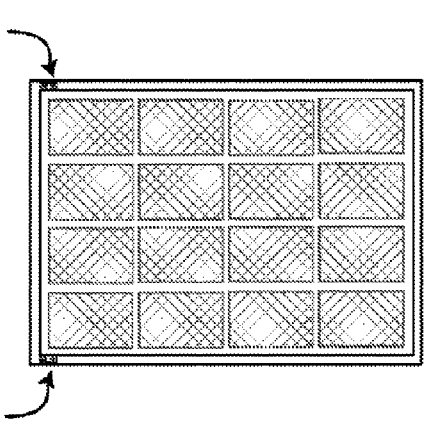
FIGS. 36 through 41 are plan views of solar modules, according to exemplary embodiments of the present invention.
Figure 37:
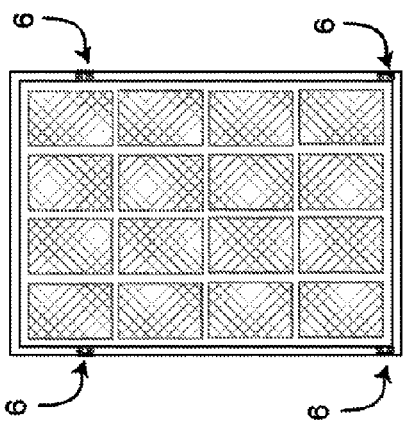
Figure 38:
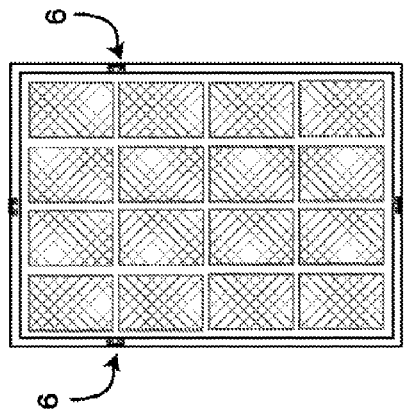
Figure 39:
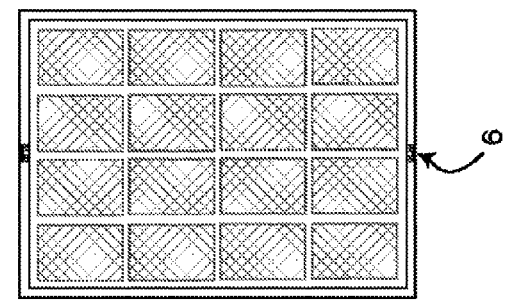
Figure 40:
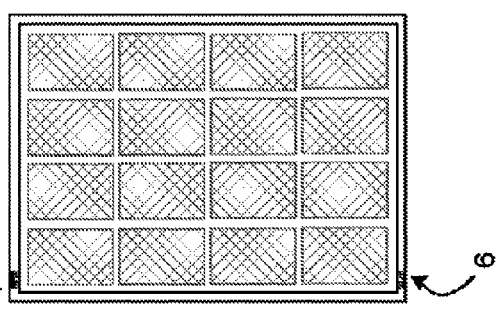
Figure 41:
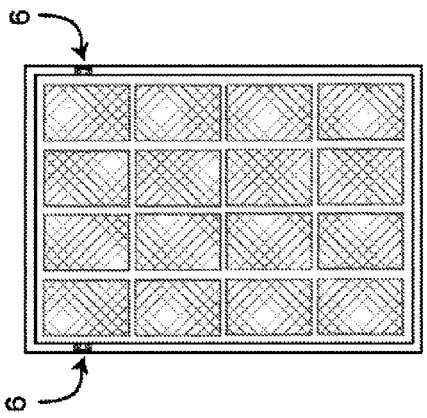

FIG. 29 is a system view of the solar modules of FIG. 26 coupled to a support structure, according to an exemplary embodiment of the present invention. The system may include a jumper wire and/or a wire path for a return wire, with or without circuit protection, and may seal an unused connection for interconnecting modules or strings of modules, according to exemplary embodiments of the present invention.

Referring to FIG. 29, the plus sign (+) denotes a positive electrical connection, the negative sign (−) denotes a negative electrical connection, and the ground symbol represents a ground electrical connection for each module, according to exemplary embodiments of the present invention. The system of modules labeled "A" are electrically interconnected when brought together with the plug connector labeled "C" of FIG. 26, and the wiring with plug ends labeled "I" may connect the two rows together. Electrical conductors/wires 35 may be run to an appliance 36 to make electrical connections, such as for example, connecting a power inverter, charge controller, or battery. In an exemplary embodiment of the present invention, the support element 37 allows for placing the modules together and making the plug connector connections.

FIGS. 30 through 35 are plan views of solar modules containing plug ports, according to exemplary embodiments of the present invention. Referring to FIGS. 30 through 35, the modules contain plug ports 7, which may be disposed in various locations, for example, internal or external to the module frame.

FIGS. 36 through 41 are plan views of solar modules containing plug ports, according to exemplary embodiments of the present invention. Referring to FIGS. 36 through 41, the modules contain plug ports 6, which may be disposed in various locations, for example, internal or external to the module frame.

According to various exemplary embodiments of the present invention, a time effective, safe way to manufacture and/or implement the electrical connections and ground connections of solar modules is provided. For example, installation time may be reduced by about one-half or more. Built-in or accessory connectors, according to exemplary embodiments of the present invention, may be used in solar modules to make electrical connections between the modules, including ground connections. For example, the plug ports of the module may be attached or fastened to the module frame such that the module is held in line with the corresponding plug connector between the two modules, as shown in FIG. 29.

The frame of the solar module may have a plug port built into it with pre-attached wires connected to the module. A plug connector (e.g., plug connector 17 or 17A) may be configured to press into the module frame for making an electrical connection with plug ports of adjacent modules. The modules may be joined together using the support element 37, as shown in FIG. 29.

According to an exemplary embodiment of the present invention, solar modules are easily fit together making the water resistant positive, negative, and ground connections, such that wiring may not be exposed to the environment on the back side of the solar modules. Referring to FIGS. 4 and 7, protection from surrounding elements could be incorporated internally, protecting the wiring 8, 9. FIGS. 4 and 7 show examples of configurations of wire connections made internally or externally on the back side of a module. For example, the connections may include a positive lead, negative lead, ground lead and/or other connections that the installer and/or manufacturer see fit to include. With no exposed wires on the underside of the modules, the safety threats of tripping, cutting or breaking wires, rodent damage, and potential fire caused by wires crossing may be minimized.

The use of circuit protection may be incorporated on the connection location and/or on the module. For example, a replaceable fuse could be connected where the wires connect to the first module on a string, such as for example, as shown in FIG. 29 where the electrical conductors 35 attach to the module B. Connection plugs, according to various exemplary embodiments of the present invention, may be shipped in the same individual packages containing the modules. The systems according to various exemplary embodiments of the present invention, may avoid the complications of having to attach an individual ground lug and wire for each module. For example, the end of each array could be a plug connector that electrically connects to the plug ports on the solar module to the next set of modules below or above, as shown in FIG. 28 where connection end block K, would connect to a return conductor. An electrical current return path could be included, for example, "R" as shown in FIG. 28, providing a simple way to have all connections in one location. According to various exemplary embodiments of the present invention electrical connections, such as positive, negative, ground and return conductors, can be made at one location and/or incorporate electrical protection such as a fuse.

Although exemplary embodiments of the present invention have been described in detail with reference to the accompanying drawings for the purpose of illustration, it is to be understood that the inventive processes and apparatus are not to be construed as limited thereby. It will be readily apparent to those of ordinary skill in the art that various modifications to the foregoing exemplary embodiments can be made without departing from the scope of the invention.

What is claimed is:

1. An electrical interconnection system connecting independent solar modules, comprising:

a plurality of solar module frames each defining an outer periphery of said independent solar modules, wherein each solar module frame includes at least two plug ports fitting inwardly of an outer peripheral surface of the solar module frame, wherein each plug port includes one or more plug holes defined therein; and at least one independent plug connector including one or more electrical conductors corresponding to the one or more plug holes, wherein the one or more plug holes receive the one or more electrical conductors therein to provide an electrical connection between side-by-side independent solar modules.

2. The electrical interconnection system of claim 1, wherein one plug hole is connected to ground.

3. The electrical interconnection system of claim 1, wherein each plug hole is T shaped.

4. The electrical interconnection system of claim 1, wherein at least one plug port is disposed within an opening in each solar module frame.

5. The electrical interconnection system of claim 1, further comprising at least one plug connector end terminal providing an electrical current return path for interconnected solar modules.

6. The electrical interconnection system of claim 1, wherein the plug connector includes two electrical conductors arranged substantially in parallel and separated by a nonconductive material.

7. The electrical interconnection system of claim 6, wherein one of the electrical conductors is used to provide a ground path.

8. The electrical interconnection system of claim 1, wherein the plug connector includes three electrical conductors arranged substantially in parallel and separated by a nonconductive material.

9. The electrical interconnection system of claim 8, wherein one of the electrical conductors is used to provide a ground path.

10. The electrical interconnection system of claim 8, wherein one of the electrical conductors is used to provide an electrical current return path for interconnected solar modules.

* * * * *